(12) United States Patent
Joedicke

(10) Patent No.: US 6,235,372 B1
(45) Date of Patent: May 22, 2001

(54) COLOR STABLE PIGMENT FOR GRANULAR SURFACE COATED ROOFING AND SIDING SHINGLES

(75) Inventor: Ingo B. Joedicke, Hedgesville, WV (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/325,820

(22) Filed: Jun. 4, 1999

Related U.S. Application Data

(62) Division of application No. 08/912,589, filed on Aug. 18, 1997, now abandoned.

(51) Int. Cl.[7] .................................................. B32B 5/16
(52) U.S. Cl. ........................ 428/145; 428/403; 428/404; 428/144; 428/150; 428/149; 428/334; 106/456; 106/457; 106/459; 106/712; 52/518
(58) Field of Search .................................... 428/145, 403, 428/404, 144, 150, 159, 334; 106/456, 457, 459, 712; 52/518

(56) References Cited

U.S. PATENT DOCUMENTS

| | | | |
|---|---|---|---|
| 2,379,358 | * 6/1945 | Jewett | 428/145 |
| 3,420,691 | * 1/1969 | Thomas | 428/403 |
| 3,894,865 | * 7/1975 | Wienert | 75/21 |
| 5,246,614 | * 9/1993 | Baumgartner et al. | 252/133 |
| 5,330,782 | * 7/1994 | Kanazawa | 427/2.25 |
| 5,405,890 | * 4/1995 | Baierweck et al. | 524/88 |

\* cited by examiner

*Primary Examiner*—William P. Watkins, III
(74) *Attorney, Agent, or Firm*—Marilyn J. Maue; William J. Davis; Walter Katz

(57) ABSTRACT

This invention relates to a color stable pigment composition for coating hard mineral granules employed for weather surfacing asphalt roofing and siding shingles. The composition is a 40–60% aqueous slurry of pigment containing ferrosoferric oxide and a silicate/clay mixture which is suitable for coating the surface of the mineral granules. The invention also pertains to a process for the manufacture of the coated granules, to the dry coated mineral granule product containing ferrosoferric oxide bonded in a silicate/clay matrix which is suitable for surfacing asphaltic shingles, to the dried composition containing from about 5 to about 50 wt. % total pigment in a silicate/clay matrix in which the pigment contains $Fe_3O_4$ in a concentration of between about 2 and about 100% and to a $Fe_3O_4$ pigment mixture per se.

22 Claims, No Drawings

COLOR STABLE PIGMENT FOR GRANULAR SURFACE COATED ROOFING AND SIDING SHINGLES

This is a division, of application Ser. No. 08/912,589 filed Aug. 18, 1997, now abandoned.

BACKGROUND OF THE INVENTION

Weather resistant granules of various hues, embedded on the surface of asphalt impregnated base materials such as roofing felt have been used extensively to provide an aesthetically pleasing color to shingles. The color of the granules is usually attained by applying a coating containing pigment in a silicate/clay matrix to the mineral granules ground to a desirable particle size. The pigment employed for this purpose should have high weather resistant properties such as resistance to oxidation, UV exposure and wet/dry or freeze/thaw cycling. In addition, it is desirable that the pigment forms a firm bond with the silicate/clay matrix to achieve color stability.

In many areas, particularly in the north, dark hues such as black, rich brown and dark gray are preferred; while in other areas, as in the south, light colored roofing is desirable. In the later case, many of the lighter colors involve blending white or light color pigments with a darkening agent to provide a softer, more aesthetic appearance. However, many of the black or dark colored pigments do not possess high weatherability. Also, many pigments used in coatings lack high tint strength or resistance to high temperature firing called for in the coated mineral particle drying operation.

Accordingly, it is an object of this invention to provide a dark pigment for use in silicate/clay mineral coatings which overcomes the above disadvantages and which is suitable for coating mineral granules.

Another object is to provide a granule coating which possesses superior weatherability, good tint strength and color stability as well as heat stability.

Still another object of the invention is to provide a commercially feasible and economical process for the manufacture of the above granules.

Yet another object is to provide a superior granular coated roofing or siding shingle which is color stable and resistant to the deleterious effects of oxidation, UV light exposure and wet/dry or freeze/thaw cycling.

These and other objects of this invention will become apparent from the following description and disclosure.

SUMMARY OF THE INVENTION

The $Fe_3O_4$ compound of this invention is synthetically produced by an exothermic iron combustion process at a temperature of between about 1400° C. and about 1700° C. This compound, which is often referred to as magnetic iron oxide, magnetite or ferrosoferric oxide, is a high density crystalline form of oxidized iron having properties distinguished from the other iron oxides, e.g. Hematite ($Fe_2O_3$) and Wustite (FeO). The unique properties of milled synthetic $Fe_3O_4$ include a color more intensely black than natural magnitite, a spinel structure for chemical stability and a higher temperature stability than that of precipitated black iron oxides. Further, the ferrosoferric iron oxide is chemically bondable to inorganic matrices. The milled magnetite employed herein is at least 90% pure and optionally may contain up to 10% FeO and/or $Fe_2O_3$ and other inorganic oxide components such as for example silica and/or alumina components.

In the present invention, the milled magnetite functions as a weather resistant, darkening agent employed alone or in admixture with another pigment to alter the color of pigmented silicate/clay coated granules which are embedded on the exposed surface of an asphalt shingle used in roofing and siding. Generally, the present ferrosoferric oxide, when employed in mixture with another pigment or pigment mixture, is present at an effective darkening or stabilizing concentration, typically at least 2 wt. %, preferably a concentration of at least 5 wt. % with respect to total pigment composition.

DETAILED DESCRIPTION OF THE INVENTION

The granules employed for roofing and siding shingles are generally derived from a hard mineral base rock such as for example, naturally occurring greenstone, greystone, nephylene syenite, gravel slate, gannister, quartzite, andesite, rhylite and the like; although synthetic base materials, including various slags and refactories are also suitable granular materials for the purposes of this invention. The base material is preferably ground to a particle size of from about 10 to about 35 mesh, i.e. particle sizes and mixtures thereof which will pass through a 10 mesh screen but be retained on a 35 mesh screen. The use of larger or smaller granules is, however, within the scope of this invention. These granules, which comprise a base substrate, are then coated with a pigment composition of between about 4 and about 18 micron ($\mu$) thickness.

The coating composition of this invention is a 35 to 65%, preferably 40–60%, aqueous slurry comprising from about 2 to about 60 wt. %, more desirably from about 5 to about 50 wt. %, of pigment and a mixture of a silicate and clay; said pigment containing $Fe_3O_4$ in a concentration between about 2 to about 100%, preferably between about 10 and about 100%. The coating composition can optionally contain up to 2.5 wt. % of a dispersant such as a lignin sulfonate; an alkali metal salt, e.g. a sodium salt of a sulfonated naphthaleneformaldehyde condensate etc. based on total coating composition. For the most homogeneous dispersions, a small amount of dispersant is recommended. Additionally, the coating composition can optionally contain up to 5 wt. % of a insolubilizing or neutralizing agent, such as a fluoroaluminate, e.g. Cryolite, a fluorosilicate, e.g. barium silico fluoride and the like and/or up to about 2 wt. % of a gas forming opacifier which is stable in alkaline solutions. Suitable opacifiers include hydrogen peroxide, sodium perborate etc. Other modifiers and excipients, depending on the option of the manufacturer may also be employed in amounts up to about 5 wt. % based on total weight of pigment-silicate/clay matrix.

A preferred coating process of the invention comprises preparing the above aqueous slurry wherein the silicate/clay is a Na silicate/kaolin clay mixture in a weight ratio of from about 2:1 to about 6:1. The total pigment component is added and intimately mixed with the aqueous slurry in a weight ratio of from about 1:2 to about 1:20, preferably from about 1:5 to about 1:15, pigment to silicate/clay mixture, to produce a slurry containing from about 40 to about 70 wt. % solids, preferably from about 45 to about 60 wt. % solids. The mineral granules, which are beneficially preheated to a temperature of between 160° and about 240° F., are then coated with the pigment-containing slurry by thorough mixing while regulating the water content of the resulting homogeneous mixture to a concentration of from about 0.1 to about 5 wt. %.

The resultant coated granules are then subjected to firing at between about 600° and about 1200° F., preferably between about 850° and about 1000° F., in a suitable apparatus, e.g. a rotary kiln, to form an irreversibly water insoluble coating of between about 3 and about 15 $\mu$ thickness. The coated granules are durable and moisture permeable, and provide a product resistant to weathering wherein the ferrosoferric oxide of the pigment is chemically bonded to a silicate/clay matrix. In the event that the granules are fired at a lower temperature, e.g. 500° F., the silicate coating composition may require addition of a pickling agent, such as aluminum chloride solution, in order to properly insolubilized the coating. Upon cooling, the color coated granules are generally post treated with a suitable processing oil and/or silicone coating composition as is known in the art.

The pigment in the silicate/clay matrix comprises up to 100% ferrosoferric oxide as defined above or mixtures of the ferrosoferric oxide with another pigment or pigments suitably employed for roofing granules. Such pigments include carbon black, titanium dioxide, cobalt blue, chromium oxide, chrome titanate, zinc ferrite, presscake red and yellow iron oxides, ultramarine blue, black ferrite, aluminum manganese oxide ($MnAl_2O_4$), manganese ferrite spinel (FeMn)$_3O_4$, aluminum iron manganese brown and mixtures thereof. When such pigment mixtures are employed, the $Fe_3O_4$ concentration is between about 2 and about 90%. In general, the total pigment concentration in the coating composition is sufficient to produce a pleasing appearance, preferably an amount between about 0.5 and about 12%, based on total dry weight of the coating composition.

Conventional granule coating compositions which include carbon black pigment may have from 5 to 100%, preferably 50–100%, of carbon black replaced with the present black ferrosoferric oxide to provide superior weatherability; however because of the lower tint strength of the present oxide with respect to carbon black, e.g. about 1:5, higher concentrations of the oxide are employed to produce the equivalent darkening or stabilizing affect.

The clay for use in this invention may be any of the conventional hydrated kaolin clays used in granule coatings of the type discussed herein and is usually present in amounts between about 30 and about 65 wt. % based on total coating on a dry basis. Similarly, conventional silicates are suitable and are usually present in amounts between about 35 and about 70 wt. % on the same basis.

Water is used as required to facilitate mixing of the initial slurry and later to provide the desired viscosity so as to maximize spread and coverage of the coating on the granule surface.

Having broadly described the invention, reference is now had to the following examples which illustrate preferred embodiments but which are not to be construed as limiting to the scope of the invention as more broadly described above and in the appended claims.

EXAMPLE 1

A solution was prepared by mixing 43 grams of aqueous sodium silicate ($SiO_2/Na_2O$ in a weight ratio of 2:9) with 20 grams of water containing 0.2 gram of dispersant (the sodium salt of a sulfonated naphthalene-formaldehyde condensate) (38.4% solids). Under rapid stirring, 1.5 grams of carbon black, 10 grams of ferrosoferric oxide (synthetic milled magnetite) and 10 grams of Kaolin clay were added to form a homogeneous slurry.

A jar containing 2000 grams of crushed rhyolite, No. 11 grading (−10 +35 mesh) was preheated to 180° F. and the above slurry was then added. The jar was sealed and the contents vigorously mixed by means of a paint shaker. The resulting granules were dried to free flowing granules with a hot air blower and then fired through a rotary kiln at a temperature of 900° F. to provide a color stable product of this invention having a deep black color.

EXAMPLE 2

The above example is repeated except that a mixture of 4 grams of the present ferrosoferric ferric oxide and 10 grams of titanium dioxide is employed, carbon black being omitted. The product obtained exhibits a stable grey color and improved weatherability.

EXAMPLE 3

Example 1 was repeated except that carbon black was substituted for the mixture of 1.5 grams of carbon black and 10 grams of $Fe_3O_4$ and it was found that 3.5 grams of carbon black were required to achieve the same color depth as the mixture of Example 1. Accordingly it is concluded that 10 grams of the ferrosoferric iron oxide permitted replacement of about 2 grams (about 55%) carbon black.

It is to be understood that the foregoing examples are intended to illustrate a preferred embodiment and the superiority of the present pigment composition and the granule product resulting from the use of instant darkening agent and that many substitutions and modifications apparent from the above disclosure can be made without departing from the spirit and scope of this invention. For example, the granule coating composition may contain any of the conventional modifiers and excipients commonly employed in such coatings which are inert with respect to ferrosoferric iron oxide.

What is claimed is:

1. In a roofing or siding system consisting essentially of an asphaltic membrane having a weather exposable surface on which is embedded 10–35 mesh mineral granules, said granules being coated with a composition containing pigment and a silicate/clay matrix the improvement in which said pigment contains between about 2 and 100 wt. % of at least 90% pure $Fe_3O_4$ bonded to the matrix and in which said composition is coated to a thickness of between about 4 and about 18$\mu$ on said granules.

2. The roofing system of claim 1 wherein the $Fe_3O_4$ of said pigment is in milled or precipitated form.

3. The roofing system of claim 1 in which said granules contain between about 0.5 and about 15 wt. % pigment.

4. The roofing system of claim 1 wherein said pigment is a mixture containing said $Fe_3O_4$ and at least one substance selected from the group consisting of carbon black, titanium dioxide, cobalt blue, chromium oxide, chrome titanate, zinc ferrite, red iron oxide, yellow iron oxide, manganese ferrite, aluminum iron manganese brown, aluminum manganese oxide spinel, ultramarine blue and mixtures thereof.

5. The roofing system of claim 4 wherein said pigment contains from about 2 to about 90% $Fe_3O_4$.

6. The roofing system of claim 1 wherein said pigment contains between about 5 and about 100% of said $Fe_3O_4$.

7. The roofing system of claim 1 wherein the weight ratio of said pigment to matrix is between about 1:2 and about 1:20.

8. The roofing system of claim 1 wherein the clay of said matrix is kaolin.

9. The roofing system of claim 6 wherein the matrix is sodium silicate/kaolin clay combined in a weight ratio of from about 2:1 to about 6:1.

10. The roofing system of claim 1 wherein said granules are selected from the group consisting of greenstone, greystone, nephylene syenite, gravel slate, gannister, quartzite, andesite, rhylite, a slag material, a refractory material and mixtures thereof.

11. The roofing system of claim 1 wherein said composition additionally contains up to at least one additive selected from the group of an insolubilizing agent, an alkaline stable opacifier, a dispersant and a pickling agent.

12. The roofing system of claim 1 wherein the $Fe_3O_4$ contains up to 10% impurities selected from the group consisting of other iron oxides, silica and alumina.

13. The roofing system of claim 1 wherein the $Fe_3O_4$ optionally contains up to 10% FeO and/or $Fe_2O_3$.

14. Weather resistant and color stable mineral granules having coated thereon a pigment coating composition in a thickness of between about 4 to 18$\mu$, said pigment coating composition being a mixture containing an effective weather resistant and color stabilizing amount of a milled or precipitated $Fe_3O_4$ pigment of at least 90% purity chemically bonded to a silicate/clay matrix.

15. The granules of claim 14 wherein the pigment of said composition contains between about 2 to about 100 wt. % of $Fe_3O_4$.

16. The granules of claim 15 wherein the pigment of said composition contains between about 5 and about 90 wt. % of $Fe_3O_4$.

17. The granules of claim 14 wherein the pigment of said composition is a mixture containing at least 2 wt. % $Fe_3O_4$ and at least one other pigment selected from the group consisting of carbon black, titanium dioxide, cobalt blue, chromium oxide, chrome titanate, zinc ferrite red iron oxide, yellow iron oxide, manganese ferrite, aluminum iron manganese brown, aluminum manganese oxide spinel and ultramarine blue.

18. The granules of claim 14 wherein the weight ratio of pigment to matrix in said composition is between about 1:2 and about 1:20.

19. The granules of claim 14 wherein the $Fe_3O_4$ pigment in said composition contains not more than 10 wt. % of impurity in the form of another iron oxide, silica, alumina or a mixture thereof.

20. In weather exposable mineral granules suitable as a coating on a roofing shingle or top sheet, wherein the granules are coated with a pigment composition containing carbon black and a silicate/clay matrix the improvement which comprises replacing at least 5% of the carbon black pigment with crystalline, high density $Fe_3O_4$ to achieve color stabilization of the pigment.

21. The mineral granules of claim 20 wherein at least 50% of the carbon black pigment is replaced with said $Fe_3O_4$.

22. Weather resistant, color stable mineral granules having coated thereon a composition containing a pigment and a silicate/clay matrix wherein said pigment contains a fade resisting amount of $Fe_3O_4$ of at least 90% purity, which $Fe_3O_4$ is chemically bonded to said matrix.

* * * * *